US010167896B2

(12) United States Patent
Malychok et al.

(10) Patent No.: US 10,167,896 B2
(45) Date of Patent: Jan. 1, 2019

(54) TRIPLE ROW YOKE ROLLER ASSEMBLY

(71) Applicant: ROLLER BEARING COMPANY OF AMERICA, INC., Oxford, CT (US)

(72) Inventors: Roman Malychok, Jamison, PA (US); Luda Malychok, Jamison, PA (US); Bradley T. Smith, Glastonbury, CT (US)

(73) Assignee: Roller Bearing Company of America, Inc., Oxford, CT (US)

( * ) Notice: Subject to any disclaimer, the term of this patent is extended or adjusted under 35 U.S.C. 154(b) by 14 days.

(21) Appl. No.: 15/416,173

(22) Filed: Jan. 26, 2017

(65) Prior Publication Data
US 2017/0211619 A1 Jul. 27, 2017

Related U.S. Application Data

(60) Provisional application No. 62/287,189, filed on Jan. 26, 2016.

(51) Int. Cl.
*F16C 19/28* (2006.01)
*F16C 33/60* (2006.01)
*F16C 33/58* (2006.01)
*F16C 43/04* (2006.01)
*F16C 13/00* (2006.01)

(52) U.S. Cl.
CPC ............ *F16C 19/28* (2013.01); *F16C 13/006* (2013.01); *F16C 33/586* (2013.01); *F16C 33/605* (2013.01); *F16C 43/04* (2013.01); *F16C 2226/12* (2013.01); *F16C 2322/00* (2013.01); *F16C 2361/00* (2013.01)

(58) Field of Classification Search
CPC .......... F16C 19/08; F16C 19/28; F16C 19/48; F16C 33/585; F16C 33/586; F16C 33/605
See application file for complete search history.

(56) References Cited

U.S. PATENT DOCUMENTS

| 2,029,265 | A | | 1/1936 | Kylen | |
|---|---|---|---|---|---|
| 3,302,987 | A | | 2/1967 | Hoffmann et al. | |
| 4,270,815 | A | * | 6/1981 | Olschewski | ............ F16O 19/28 384/561 |
| 4,298,331 | A | | 11/1981 | Mueller | |
| 4,398,776 | A | * | 8/1983 | Kutemeier | .............. F16O 19/28 384/560 |

(Continued)

FOREIGN PATENT DOCUMENTS

| WO | 2014188900 A1 | 11/2014 |
|---|---|---|
| WO | 2015003696 A1 | 1/2015 |
| WO | 2015176700 A1 | 11/2015 |

*Primary Examiner* — James Pilkington
(74) *Attorney, Agent, or Firm* — Murtha Cullina LLP

(57) ABSTRACT

A yoke roller assembly includes an inner ring disposed in an outer ring. The yoke roller assembly includes first, second and third rows of rollers positioned between the inner ring and the outer ring. The outer ring has a first width, a first outside diameter and a radially outwardly extending lobe circumferentially extending therearound and formed integrally therewith. The lobe has opposing axial end faces extending a second width, and has a second outside diameter. The second row of rollers are positioned axially inward of the axial end faces of the lobe. The first and third row of rollers each have an axial end positioned axially inward of the axial end faces of the lobe.

16 Claims, 2 Drawing Sheets

(56) References Cited

U.S. PATENT DOCUMENTS

| | | | |
|---|---|---|---|
| 4,605,390 A | 8/1986 | Nagata et al. | |
| 5,517,957 A * | 5/1996 | Wagner | F16O 19/28 123/192.1 |
| 5,531,137 A | 7/1996 | Guilford | |
| 7,841,222 B2 | 11/2010 | Cook et al. | |
| 2016/0061257 A1 | 3/2016 | Peterson | |
| 2016/0195136 A1 | 7/2016 | Kazama | |

* cited by examiner

TRIPLE ROW YOKE ROLLER ASSEMBLY

CROSS-REFERENCE TO RELATED APPLICATIONS

This application claims the benefit of U.S. Provisional Patent Application No. 62/287,189 filed on Jan. 26, 2016, the contents of which are incorporated herein by reference in its entirety.

TECHNICAL FIELD

The present invention is directed to a triple row yoke roller assembly and more specifically to a triple row yoke roller assembly adapted for a pre-assembled use in a beverage can body forming machine.

BACKGROUND

Beverage can body forming machines employ various mechanical components including punch presses, metal forming dies, metal bending devices, cam follower rollers and cams to form the beverage cans. In some instances stud type cam followers are employed in such machines. Stud type cam followers include a stud that is threaded on one end for mounting to the machine, for example by threading into a female threaded bore or pushed through a hole and fixed in place with a nut. The other end of the stud has a bearing mounted thereto. Typically, cam follower yoke assemblies including bearings are provided for installation in beverage can forming machines as a set of unassembled components that are required to be installed in a prescribed order in the machine.

Prior art cam followers are subject to rapid speed changes that cause accelerated wear of the cam followers and mating cams. As the prior art cam followers wear, performance and production output rates of the beverage can forming machine degrade, due to increased friction in the cam follower. As a result of this wear of the cam follower, the beverage can forming machine will need to be taken out of service for assembly of the replacement cam follower components and installation of the cam follower.

There is an unsolved need for an improved cam follower that can more simply be installed in beverage can forming machines and that has a longer service life than prior art cam followers.

SUMMARY

There is disclosed herein a yoke roller assembly for a beverage can forming machine. The yoke roller assembly includes an outer ring that has an interior area defined by an inner surface which extends a first width between a first axial end and a second axial end of the outer ring. The outer ring has a first outside diameter and first inside diameter. The inner surface has a radially inward facing bearing surface extending between a first radially inwardly extending flange and a second radially inwardly extending flange. The yoke roller assembly also includes an inner ring that has an outer surface which extends between a third axial end and a fourth axial end of the inner ring. The inner ring extends through the interior area of the outer ring. The outer surface has a first axially outwardly extending shoulder proximate the third axial end and a second axially outwardly extending shoulder proximate the fourth axial end. A radially outwardly facing bearing surface extends between the first axially outwardly extending shoulder and the second axially outwardly extending shoulder. The yoke roller assembly also includes a first end plate positioned (e.g., fixed in place by swaging or interference fit) at the first axially outwardly extending shoulder and a second end plate positioned (e.g., fixed in place by swaging or interference fit) at the second axially outwardly extending shoulder. The yoke roller assembly further includes a first row of a plurality of first rollers, a second row of a plurality of second rollers, and a third row of a plurality of third rollers. Each of the first row of the plurality of first rollers, the second row of the plurality of second rollers, and the third row of the plurality of third rollers is positioned in the interior area between and in rolling engagement with the radially outwardly facing bearing surface and the radially inward facing bearing surface. The first row of the plurality of first rollers, the second row of the plurality of second rollers and the third row of the plurality of third rollers is axially retained by the first radially inwardly extending flange and the second radially inwardly extending flange; and/or the first end plate and the second end plate. The outer ring has a radially outwardly extending lobe circumferentially extending therearound. The lobe has a substantially rectangular cross section and is formed integrally with the outer ring. The lobe has opposing axial end faces that extend a second width in an axial direction. The second rollers are positioned axially inward of the axial end faces of the lobe. The lobe has a second outside diameter. The first rollers and third rollers each have an axial end positioned axially inward of the axial end faces of the lobe.

In one embodiment, the ratio of the second width to the first width is between 0.4 and 0.5.

In one embodiment, the ratio of the first outside diameter to the second outside diameter is between 0.6 and 0.8.

In one embodiment, the first axially outwardly extending shoulder and/or the second axially outwardly extending shoulder define a tapered surface that extends radially and axially outwardly.

DETAILED DESCRIPTION

Figure 1:
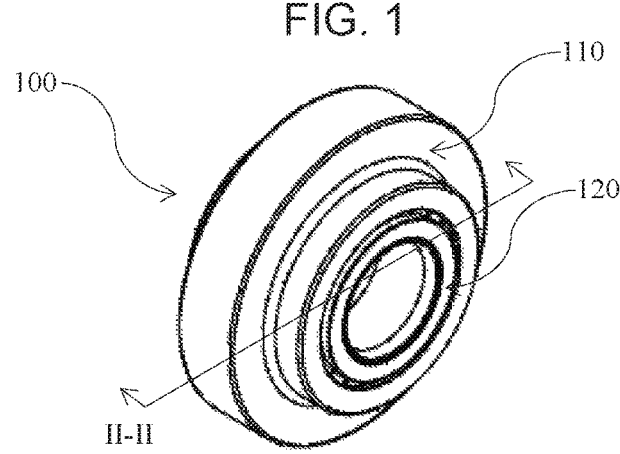
FIG. 1 is a perspective view of a yoke roller assembly having three rows of rollers of the present invention.
Figure 2:
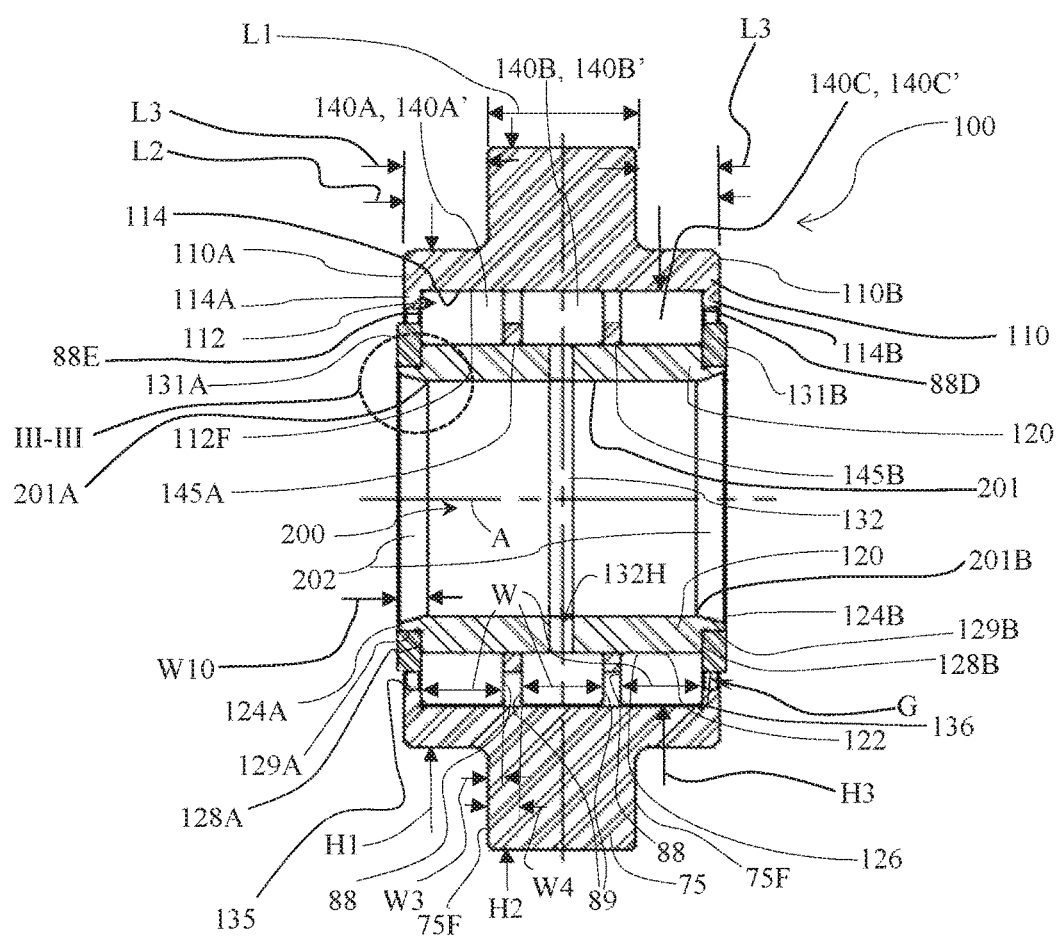
FIG. 2 is a cross sectional view of the outer ring and inner ring of the yoke roller assembly of FIG. 1 taken across line II-II of FIG. 1.

As shown in FIGS. 1 and 2, a yoke roller assembly for various industrial and commercial applications, including but not limited to use in beverage can body forming machines is generally indicated by the numeral 100. The yoke roller assembly 100 includes a bearing having an outer ring 110 and an inner ring 120 extending through the outer ring 110 (as described further below). The outer ring 110 is adapted to rotate relative to the inner ring 120. The yoke roller assembly 100 is adapted for installation in an assembled state to preclude the need for assembling components of the yoke roller assembly in the field, for example, during maintenance outages of the beverage can body forming machine. In one embodiment, the yoke roller assembly 100 is adapted for installation in a beverage can forming machine, in a pre-assembled state. In one embodiment, the inner ring 120 and the outer ring 110 are manufactured from a metallic material such as a steel alloy or stainless steel alloy.

As shown in FIG. 2, the outer ring 110 has an interior area 112 defined by an inner surface 112F extending between a first axial end 110A and a second axial end 110B of the outer ring 110. The inner surface 112F has a radially inward facing bearing surface 114 extending between a first radially inwardly extending flange 114A and a second radially inwardly extending flange 114B.

As is further shown in FIG. 2, the inner ring 120 extends through the interior area 112 of the outer ring 110. The inner ring 120 has an outer surface 122 that extends between a third axial end 124A of the inner ring 120 and a fourth axial end 124B of the inner ring. The outer surface 122 has a first axially outwardly extending shoulder 128A proximate the third axial end 124A and a second axially outwardly extending shoulder 128B proximate the fourth axial end 124B. A radially outwardly facing bearing surface 126 extends between the first axially outwardly extending shoulder 128A and the second axially outwardly extending shoulder 128B. A first radially outwardly facing seating surface 129A extends along the outer surface 122 from the first axially outwardly extending shoulder 128A axially outwardly to the third axial end 124A; and a second radially outwardly facing seating surface 129B extends along the outer surface 122 from the second axially outwardly extending shoulder 128B axially outward to the fourth axial end 124B.

A first end plate 131A (e.g., an annular ring or washer made of a metallic material such as a steel alloy or stainless steel alloy) is positioned at (e.g., an axially inward surface 135F (see FIG. 3) of the first end plate abutting) the first axially outwardly extending shoulder 128A and a radially inward facing surface 133 (see FIG. 3) of the first end plate 131A engages the first radially outwardly facing seating surface 129A. A second end plate 131B (e.g., an annular ring or washer made of a metallic material such as a steel alloy or stainless steel alloy) is positioned at (e.g., an axially inward surface 135F of the second end plate abutting abutting) the second axially outwardly extending shoulder 128B and a radially inward facing surface 133 of the second end plate 131B engages the second radially outwardly facing seating surface 129B. In one embodiment, the first end plate 131A is press fit (i.e., interference fit) onto the first radially outwardly facing seating surface 129A. In one embodiment, the second end plate 131B is press fit (i.e., interference fit) onto the second radially outwardly facing seating surface 129B. In one embodiment, the end plates 131A and/or 131B are swaged into the inner ring 120 by swaging tapered surfaces 202 on a radially inner circumferential surface of the respective shoulder 128A and 128B, radially outward, as described further herein with reference to FIGS. 2 and 3. The first and second end plates 131A and 131B have a radially outward facing circumferential surface 136 that is spaced apart from a radially inward facing circumferential surface 135 of the respective flange 114A and 114B by a gap G to facilitate rotation of the outer ring 110 relative to the inner ring 120.

The inner ring 120 has a groove 132 formed therein. The groove 132 facilitates lubrication of components that are regularly in dynamic contact during use (e.g., the inner ring, the outer ring, etc.). The groove 132 communicates with one or more lubricant pathways 132H (for example, two lubricant pathways 132H are shown in FIG. 2), which further facilitate lubrication of contacting components of the yoke roller assembly 100.

As is further shown in FIG. 2, the yoke roller assembly 100 further includes a first row 140A of a plurality of first rollers 140A', a second row 140B of a plurality of second rollers 140B', and a third row 140C of a plurality of third rollers 140C'. Each of the first rollers 140A' in the first row 140A, each of the second rollers 140B' in the second row 140B, and each of the third rollers 140C' in the third row 140C' are positioned in the interior area 112, and are—individually and collectively—positioned between; and in rolling engagement with: (1) the radially outwardly facing bearing surface 126; and (2) the radially inward facing bearing surface 114. In one embodiment, the plurality of first rollers 140A', the plurality of second rollers 140B', and/or the plurality of third rollers 140C' are manufactured from a metallic material such as a steel alloy or stainless steel alloy.

An axial end 88E of each of the first rollers 140A' of the first row 140A engages (e.g., slidingly engages) an axially inward facing side surface of the first radially extending flange 114A. Each of the second rollers 140B' of the second row 140B is positioned between the first row 140A and the third row 140C. An axial end 88D of each of the third rollers 140C' of the third row 140C engages (e.g., slidingly engages) an axially inward facing side surface of the second radially extending flange 114B. The axial end 88E of each of the first rollers 140A' of the first row 140A engages (e.g., slidingly engages) an axially inward facing side surface of the first end plate 131A. The axial end 88D of each of the third rollers 140C' of the third row 140C engages (e.g., slidingly engages) an axially inward facing side surface of the second end plate 131B. The first radially extending flange 114A; the second radially extending flange 114B; the first end plate 131A and/or the second end plate 131B cooperate with one another to axially retain and limit axial movement of the first rollers 140A', the second rollers 140B' and the third rollers 140C'.

In one embodiment, shown in FIG. 2, a spacer 145A is positioned between the first row 140A and the second row 140B. Each of the first rollers 140A' and the second rollers 140B' engage (e.g., slidingly engages) the spacer 145A. The present invention is not limited in this regard, however, as additional spacers may be employed. For example, an additional spacer could be positioned between the first row 140A and the first radially inwardly extending flange 114A.

In one embodiment, shown in FIG. 2 a spacer 145B is positioned between the second row 140B and the third row 140C. Each of the second rollers 140B' and the third rollers 140C' engage (e.g., slidingly engages) the spacers 145B. The present invention is not limited in this regard, however, as additional spacers may be employed. For example, an additional spacer could be positioned between the third row 140C and the second radially inwardly extending flange 114B.

As used herein, the term "spacer," such as the spacer 145, is used in reference to an element adapted to create separation between rollers. For example, the spacer 145A of FIG. 2 is an annular ring adapted to maintain a predetermined distance between the first row 140A and the second row 140B; and the spacer 145B of FIG. 2 is an annular ring adapted to maintain a predetermined distance between the second row 140B and the third row 140C. In one embodiment, the spacers 145 are manufactured from a metallic material, such as a steel alloy or a stainless steel alloy. In one embodiment, the spacers 145 are manufactured from a plastic material or polymer.

Figure 3:
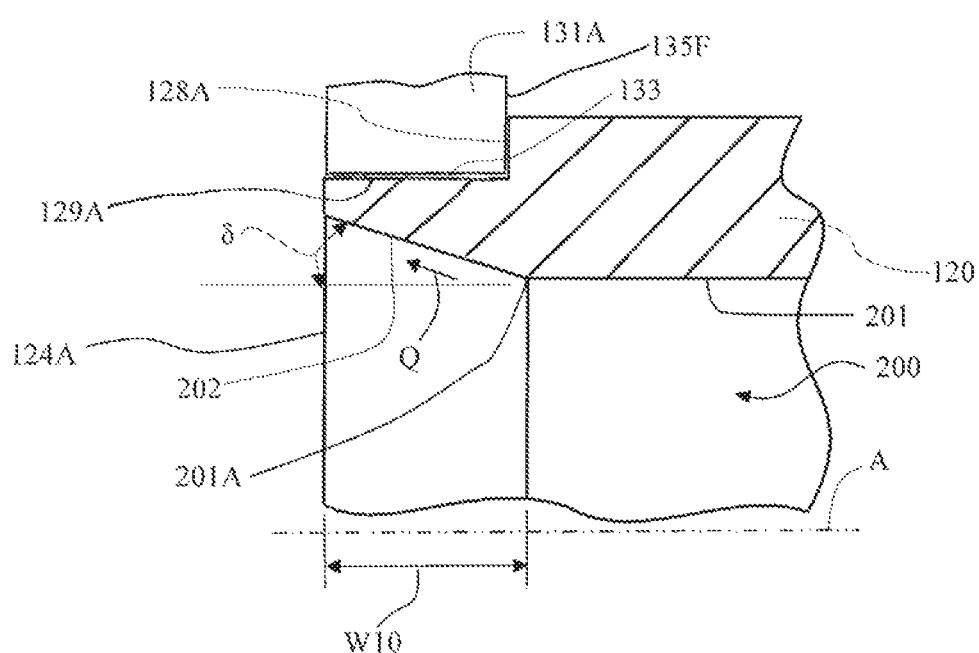
FIG. 3 is an enlarged view of detail III-III of FIG. 2.

In one embodiment, as shown in FIG. 2, the inner ring 120 has a bore 200 extending therethrough. The bore 200 includes an interior cylindrical surface 201 that extends from an edge of the groove 132 to a first end 201A and from an opposite edge of the groove 132 to a second end 201B, thereof. Each of the first axially outwardly extending shoulder 128A and the second axially outwardly extending shoulder 128B have the tapered surface 202 extending radially and axially outwardly on a radially inward facing surface of the respective shoulder 128A and 128B, from the respective one of the first end 201A and the second end 201B, in the direction of the arrow Q, as shown in FIG. 3. The tapered surface 202 is adapted to facilitate installation of the yoke roller assembly 100, e.g., upon a shaft of slightly larger diameter than the bore. In one embodiment, the tapered surface 202 is defined by an angle δ (see FIG. 3) measured relative to a line parallel to a longitudinal axis A of the yoke roller assembly 100. In one embodiment, the angle δ is between 5 and 20 degrees. In one embodiment, the tapered surface 202 extends an axial distance W10. The tapered surfaces 202 are adapted to facilitate swaging of the end plates 131A and 131B into the inner ring 120, for example, by creating an area of reduced cross section on the tapered surfaces 202 that are swaged radially outward to fixedly secure the end plates 131A and 131B in position in the inner ring 120. The swaging of the tapered surfaces 202 radially outward causes the respective first and second radially outwardly facing seating surfaces 129A and 129B to fixedly engage the respective end plate 131A and 131B, for example at a radially inner portion of the end plates 131A and 131B.

In one embodiment, the yoke roller assembly 100 is adapted for installation in an assembled state. In one embodiment, the yoke roller assembly 100 is adapted for use in a beverage can forming machine.

As shown in FIG. 2, the outer ring 110 of the yoke roller assembly 100 has an axial width L2 that extends between the first end 110A and the second end 110B. The outer ring 110 has an outside diameter H1 proximate each of the first end 110A and the second end 110B. The outer ring 110 has an inside diameter H3 measured across the radially inward facing bearing surface 114. The outer ring 110 has a radially outwardly extending lobe 75 circumferentially extending around the outer ring 110. The lobe 75 is positioned between (e.g., centered) the first end 110A and the second end 110B of the outer ring 110. The lobe 75 has an outside diameter H2 and an axial width L1. The width L1 of the lobe 75 is less than the width L2 of the outer ring 110. In one embodiment, the ratio of the width L1 to the width L2 is between 0.4 and 0.5. The outside diameter H1 is of the outer ring 110 is less than the outside diameter L2 of the lobe 75. In one embodiment, the ratio of the outside diameter H1 to the outside diameter H2 is between 0.6 and 0.8. In one embodiment, the ratio of the inside diameter H3 to the outside diameter H1 is from 0.7 to 0.9. In one embodiment, the ratio of the inside diameter H3 to the outside diameter H1 is from 0.8 to 0.85. The ratio of the inside diameter H3 to the outside diameter H1 is configured to reduce the mass of outer ring 110 and thus the inertial effects due to rapid acceleration when the outer ring 110 engages the cam during operation. This ratio compares to prior art bearings having a ratio of the inside diameter H3 to the outside diameter H1 of less than 70 percent.

As shown in FIG. 2, the first rollers 140A', the second rollers 140B' and the third rollers 140C' have an axial width W. The first rollers 140A' and the third rollers 140C' have inboard axial end faces 88 and the second rollers 140B' have opposing axial end faces 89. The lobe 75 has opposing axial end faces 75F. One of the axial faces 75F is spaced apart from the first axial end 110A of the outer ring 110 by a distance L3. Similarly, the opposing axial face 75F is spaced apart from the second axial end 110B by a distance L3. The distance L3 is equal to the width L2 of the outer ring 110 minus the width W1 of the lobe 75, divided by two. In one embodiment, the width W10 of the tapered surface 202 is from 10 to 35 percent of the distance L3. In one embodiment, the width W10 of the tapered surface 202 is between 5 and 20 percent of the distance L3. The second rollers 140B' are positioned axially between the inner ring 120 and the outer ring 110 such that the opposing axial ends 89 of the second rollers 140B' are axially inward from the respective axial end faces 75F of the lobe 75, (e.g., the axial end 89 of the second rollers 140B' are spaced apart from the axial end faces 75F of the lobe 75 by a distance W4). The axial end faces 88 of the first rollers 140A' and the third rollers 140C' are positioned axially inward of the respective axial end faces 75F of the lobe 75 (e.g., the axial ends 88 of the first rollers 140A' and the third rollers 140C' are spaced apart from the axial end faces 75F of the lobe 75 by a distance W3). The distances W3 and W4 are predetermined and selected to minimize flexure of the outer ring 110 under loaded conditions.

Applicant has surprisingly discovered that the yoke roller assembly 100 of the present invention has an operating life with insignificant wear of at least four times that of a comparable prior art bearing having only two rows of rollers, as verified via field testing in an actual production environment.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A yoke roller assembly for a beverage can forming machine, the yoke roller assembly comprising:
  an outer ring having an interior area defined by an inner surface extending a first width between a first axial end and a second axial end, the outer ring having a first outside diameter and first inside diameter, the inner surface having a radially inward facing bearing surface extending between a first radially inwardly extending flange and a second radially inwardly extending flange;
  an inner ring having an outer surface extending between a third axial end and a fourth axial end, the inner ring extending through the interior area of the outer ring, the outer surface having a first axially outwardly extending shoulder proximate the third axial end and a second axially outwardly extending shoulder proximate the fourth axial end and a radially outwardly facing bearing surface extending between the first axially outwardly extending shoulder and the second axially outwardly extending shoulder;
  a first end plate positioned at the first axially outwardly extending shoulder and a second end plate positioned at the second axially outwardly extending shoulder;
  a first row of a plurality of first rollers, a second row of a plurality of second rollers, and a third row of a plurality of third rollers, each of the first row of the plurality of first rollers, the second row of the plurality of second rollers, and the third row of the plurality of third rollers being positioned in the interior area between and in rolling engagement with the radially outwardly facing bearing surface and the radially inward facing bearing surface;

the first row of the plurality of first rollers, the second row of the plurality of second rollers and the third row of the plurality of third rollers being axially retained by at least two of the first radially inwardly extending flange, the second radially inwardly extending flange, the first end plate and the second end plate;

the outer ring having a radially outwardly extending lobe circumferentially extending therearound, the lobe having a substantially rectangular cross section and being formed integrally with the outer ring, the lobe having opposing axial end faces extending a second width and the second rollers are positioned axially inward of the axial end faces of the lobe, the lobe having a second outside diameter; and the first rollers and third rollers each have an axial end positioned axially inward of the axial end faces of the lobe.

2. The yoke roller of claim 1, wherein a ratio of the second width to the first width is between 0.4 and 0.5.

3. The yoke roller of claim 1, wherein a ratio of the first outside diameter to the second outside diameter is between 0.6 and 0.8.

4. The yoke roller of claim 1, wherein the inner ring defines a bore extending therethrough.

5. The yoke roller of claim 1, wherein at least one of the first axially outwardly extending shoulder and the second axially outwardly extending shoulder define a tapered surface extending radially and axially outwardly.

6. The yoke roller of claim 1, further comprising a first spacer disposed between the first row of the plurality of first rollers and the second row of the plurality of second rollers.

7. The yoke roller of claim 6, further comprising a second spacer disposed between the second row of the plurality of second rollers and the third row of the plurality of third rollers.

8. The yoke roller of claim 1, further comprising a radially outwardly facing seating surface extending along the outer surface from the first axially outwardly extending shoulder axially outwardly to the third axial end and wherein the first end plate is press fit onto the radially outwardly facing seating surface.

9. The yoke roller of claim 1, further comprising a radially outwardly facing seating surface extending along the outer surface from the second axially outwardly extending shoulder axially outwardly to the fourth axial end and wherein the second end plate is press fit onto the radially outwardly facing seating surface.

10. The yoke roller of claim 1, wherein a ratio of the first inside diameter of the outer ring to the first outside diameter of the outer ring is from 0.7 to 0.9.

11. The yoke roller of claim 1, wherein a ratio of the first inside diameter of the outer ring to the first outside diameter of the outer ring is from 0.8 to 0.85.

12. The yoke roller of claim 1, wherein a ratio of the first inside diameter of the outer ring to the first outside diameter of the outer ring is configured to reduce inertial effects due to rapid rotational speed changes of the outer ring relative to the inner ring.

13. The yoke roller of claim 1, further comprising a radially outwardly facing seating surface extending along the outer surface from the first axially outwardly extending shoulder axially outwardly to the third axial end and wherein the radially outwardly facing seating surface is swaged radially outward into the first end plate to fixedly secure the first end plate to the inner ring.

14. The yoke roller of claim 1, further comprising a radially outwardly facing seating surface extending along the outer surface from the second axially outwardly extending shoulder axially outwardly to the fourth axial end and wherein the radially outwardly facing seating surface is swaged radially outward into the second end plate to fixedly secure the second end plate to the inner ring.

15. The yoke roller of claim 1, wherein the first axially outwardly extending shoulder has a tapered surface extending radially and axially outwardly; and a radially outwardly facing seating surface extends along the outer surface from the first axially outwardly extending shoulder axially outwardly to the third axial end and wherein the tapered surface is swaged radially outward so that the radially outwardly facing seating surface is fixedly secured to the first end plate.

16. The yoke roller of claim 1, wherein the second axially outwardly extending shoulder has a tapered surface extending radially and axially outwardly; and a radially outwardly facing seating surface extends along the outer surface from the second axially outwardly extending shoulder axially outwardly to the fourth axial end and wherein the tapered surface is swaged radially outward so that the radially outwardly facing seating surface is fixedly secured to the second end plate.

* * * * *